(12) United States Patent
Park et al.

(10) Patent No.: US 9,141,208 B2
(45) Date of Patent: Sep. 22, 2015

(54) METHOD OF SEGMENTING MULTIPLE TOUCHES IN TOUCH SENSING SYSTEM

(71) Applicant: Samsung Electronics Co., Ltd., Suwon-si (KR)

(72) Inventors: Jong-kang Park, Iksan-si (KR); Young-tae Son, Suwon-si (KR); Hae-yong Ahn, Chungju-si (KR); Jong-hak Baek, Seoul (KR); Mi-hye Jung, Anyang-si (KR); Yoon-kyung Choi, Yongin-si (KR); Gyoo-cheol Hwang, Seongnam-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 253 days.

(21) Appl. No.: 13/655,453

(22) Filed: Oct. 19, 2012

(65) Prior Publication Data
US 2013/0169561 A1 Jul. 4, 2013

(30) Foreign Application Priority Data
Dec. 30, 2011 (KR) .................. 10-2011-0147422

(51) Int. Cl.
G06F 3/041 (2006.01)
G06F 3/0488 (2013.01)

(52) U.S. Cl.
CPC .............. *G06F 3/041* (2013.01); *G06F 3/0416* (2013.01); *G06F 3/0488* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 7,782,307 B2* | 8/2010 | Westerman et al. | 345/173 |
| 8,692,795 B1* | 4/2014 | Kremin et al. | 345/174 |
| 2010/0097328 A1* | 4/2010 | Simmons et al. | 345/173 |
| 2011/0103711 A1 | 5/2011 | Su et al. | |
| 2011/0175837 A1 | 7/2011 | Westerman et al. | |
| 2011/0242052 A1* | 10/2011 | Ningrat | 345/174 |
| 2012/0154313 A1* | 6/2012 | Au et al. | 345/173 |
| 2012/0194452 A1* | 8/2012 | Cho et al. | 345/173 |
| 2012/0235937 A1* | 9/2012 | Sleeman et al. | 345/173 |

FOREIGN PATENT DOCUMENTS

| | | |
|---|---|---|
| KR | 10-2006-0041576 A | 5/2006 |
| KR | 10-0933710 A | 12/2009 |

* cited by examiner

*Primary Examiner* — Srilakshmi K Kumar
*Assistant Examiner* — Krishna Neupane
(74) *Attorney, Agent, or Firm* — Muir Patent Law, PLLC

(57) ABSTRACT

A method of segmenting multiple touches in a touch sensor system is disclosed. The method includes setting a point node by selecting a valid node of a touch sensor panel from among valid nodes having touch data equal to or greater than a threshold value of a touch sensor panel; determining one or more candidate labels for the point node by searching for adjacent nodes around the point node; and when there are two or more candidate labels for the point node, labeling the point node by selecting a label of a label group that has the highest group similarity with the point node and that is from among label groups of the two or more candidate labels, and by assigning the selected label to the point node.

25 Claims, 15 Drawing Sheets

FIG. 2B

|    | 1 | 2 | 3 | 4  | 5   | 6   | 7   | 8   | 9  | 10 | 11 | 12 |
|----|---|---|---|----|-----|-----|-----|-----|----|----|----|----|
| 1  | 1 | 0 | 0 | 1  | 6   | 6   | 6   | 3   | 1  | 0  | 0  | 0  |
| 2  | 0 | 1 | 1 | 3  | 9   | 11  | 11  | 5   | 3  | 2  | 0  | 0  |
| 3  | 0 | 0 | 2 | 5  | 21  | 55  | 39  | 8   | 3  | 1  | 0  | 0  |
| 4  | 0 | 0 | 3 | 10 | 76  | 102 | 84  | 11  | 2  | 1  | 0  | 0  |
| 5  | 2 | 1 | 5 | 32 | 106 | 107 | 89  | 22  | 13 | 6  | 0  | 0  |
| 6  | 0 | 0 | 3 | 29 | 100 | 103 | 71  | 59  | 40 | 0  | 0  | 0  |
| 7  | 0 | 1 | 2 | 7  | 31  | 45  | 87  | 100 | 85 | 0  | 0  | 0  |
| 8  | 0 | 1 | 1 | 2  | 6   | 38  | 101 | 105 | 90 | 0  | 0  | 0  |
| 9  | 0 | 0 | 0 | 1  | 4   | 31  | 102 | 104 | 70 | 0  | 0  | 0  |
| 10 | 0 | 0 | 1 | 0  | 4   | 2   | 34  | 36  | 0  | 0  | 0  | 0  |
| 11 | 0 | 0 | 0 | 0  | 2   | 1   | 8   | 0   | 0  | 0  | 0  | 0  |

FIG. 3A

|   | 1 | 2 | 3 | 4 | 5 | 6 |
|---|---|---|---|---|---|---|
| 1 | 0 | 1 | 1 | 0 | 0 | 0 |
| 2 | 5 | 36 | 27 | 11 | 19 | 2 |
| 3 | 18 | 128 | 102 | 82 | 101 | 16 |
| 4 | 7 | 49 | 41 | 72 | 80 | 15 |
| 5 | 0 | 2 | 2 | 7 | 9 | 1 |

NODE (2, 1)
NODE (2, 2)

FIG. 3B

|   | 1 | 2 | 3 | 4 | 5 | 6 |
|---|---|---|---|---|---|---|
| 1 | 0 | 1 | 1 | 0 | 0 | 0 |
| 2 | 5 | 36 | 27 | 11 | 19 | 2 |
| 3 | 18 | 128 | 102 | 82 | 101 | 16 |
| 4 | 7 | 49 | 41 | 72 | 94 | 15 |
| 5 | 0 | 2 | 2 | 7 | 9 | 1 |

FIG. 3C

|   | 1 | 2 | 3 | 4 | 5 | 6 |
|---|---|---|---|---|---|---|
| 1 |   |   |   |   |   |   |
| 2 |   | 36 | 27 |   | 19 |   |
| 3 | 18 | 128 | 102 | 82 | 101 | 16 |
| 4 |   | 49 | 41 | 72 | 80 | 15 |
| 5 |   |   |   |   |   |   |

FIRST LABEL GROUP (LABEL 1)

SECOND LABEL GROUP (LABEL 2)

FIG. 3D

|   | 1 | 2 | 3 | 4 | 5 | 6 |
|---|---|---|---|---|---|---|
| 1 |   |   |   |   |   |   |
| 2 |   | 1 | 1 |   | 2 |   |
| 3 | 1 | 1 | 1 | 2 | 2 | 2 |
| 4 |   | 1 | 1 | 2 | 2 | 2 |
| 5 |   |   |   |   |   |   |

SECOND LABEL GROUP (LABEL 2)

FIRST LABEL GROUP (LABEL 1)

FIG. 3E

|   | 1 | 2 | 3 | 4 | 5 | 6 |
|---|---|---|---|---|---|---|
| 1 |   |   | 60 | 99 | 80 |   |
| 2 |   | 36 | 27 | 90 | 81 |   |
| 3 | 18 | 128 | 102 | 82 | 101 | 16 |
| 4 |   | 49 |   |   | 80 | 15 |
| 5 |   |   |   |   |   |   |

FIRST LABEL GROUP (LABEL 1)

THIRD LABEL GROUP (LABEL 3)

SECOND LABEL GROUP (LABEL 2)

METHOD OF SEGMENTING MULTIPLE TOUCHES IN TOUCH SENSING SYSTEM

CROSS-REFERENCE TO RELATED APPLICATIONS

This application claims the benefit of Korean Patent Application. No. 10-2011-0147422, filed on Dec. 30, 2011, in the Korean Intellectual Property Office, the disclosure of which is incorporated herein in its entirety by reference.

BACKGROUND

The disclosed embodiments relate to a method of segmenting multiple touches in a touch sensing system using a touch panel, and more particularly, to a method of segmenting touches based on touch data obtained via a touch panel so as to recognize multiple touches in a touch sensing system using the touch panel.

Recently, electronic devices have become small and slim, so that a touch screen is widely used to input, instead of using a button-type interface method including a keyboard. In particular, much research is actively being conducted into a user interface using multiple touches in an electrostatic capacitive-type touch screen.

An electrostatic capacitive-type touch sensing system recognizes the occurrence of multiple touches by sensing a change of an electrostatic capacity between two electrodes. In order to recognize the occurrence of multiple touches, two-dimensional (2D) touch data is segmented, and in this regard, when a conventional technique for image segmentation is used, a characteristic of the touch data is not reflected, such that it may be difficult to satisfy exactness and calculation complexity that are required to calculate touch coordinates. Thus, there is a demand for a method of segmenting multiple touches, which reflects the characteristic of the touch data.

SUMMARY

According to one embodiment, a method of segmenting multiple touches in a touch sensor system is provided. The method includes operations of setting a point node by selecting a valid node of a touch panel from among valid nodes having touch data equal to or greater than a threshold value of a touch sensor panel; determining one or more candidate labels for the point node by searching for adjacent nodes around the point node; and when there are two or more candidate labels for the point node, labeling the point node by selecting a label of a label group that has the highest group similarity with the point node and that is from among label groups of the two or more candidate labels, and by assigning the selected label to the point node.

The operation of determining the candidate label may include an operation of determining labels of the adjacent nodes having touch data greater than touch data of the point node as the candidate label for the point node.

When at least one adjacent node from among the adjacent nodes having touch data greater than touch data of the point node is not labeled, the operation of determining one or more of the candidate labels may include operations of setting the at least one adjacent node as a new point node, labeling the new point node, and then determining a candidate label for the point node based on the labels of the adjacent nodes having touch data greater than touch data of the new point node.

When there is only one candidate label, the operation of labeling the point node may include an operation of assigning the one candidate label to the point node.

When there is no candidate label to be assigned to the point node, the operation of labeling the point node may include operations of assigning a new label to the point node if at least one adjacent node from among the adjacent nodes is a valid node, and processing the point node as an invalid node if a valid node does not exist in the adjacent nodes.

When there are two or more candidate labels, the operation of labeling the point node may include operations of setting the point node as a conflict node and storing the conflict node, and then the operations of setting the point node, determining the candidate label, and labeling the point node may be repeated to label valid nodes except for the conflict node, and after the valid nodes except for the conflict node are labeled, the conflict node may be labeled by the operation of selecting a label for the conflict node.

The group similarity may be determined according to a distance between the point node and a peak node from among the valid nodes included in the label group.

The group similarity may be determined according to a distance between the label group and the point node.

The group similarity may be determined according to a difference between touch data of the point node and touch data of a peak node from among the valid nodes included in the label group.

The group similarity may be determined according to a difference between touch data of the point node and touch data of an adjacent node included in the label group.

The touch data may be obtained by measuring decreased capacitances of each node included in a touch panel.

According to another embodiment, a method of segmenting multiple touches in a touch sensor system is disclosed. The method includes operations of receiving touch data of each of a plurality of nodes included in a touch panel; selecting and labeling a node from among nodes having touch data equal to or greater than a threshold value, and when two or more labels are assigned among nodes having touch data greater than touch data of the selected node, which nodes are adjacent nodes around the selected random node, labeling the selected node with a selected label, wherein the label is from among the two or more labels and has the highest group similarity with the selected random node; and as a result of all valid nodes of the plurality of nodes being labeled, segmenting the valid nodes into one or more label groups according to the labels.

The method may further include an operation of performing correction by combining at least two adjacent label groups from among the one or more label groups, or by re-segmenting one label group into at least two label groups.

The operation of performing the correction may include an operation of determining whether to combine the at least two adjacent label groups by comparing touch data of each peak node of the at least two adjacent label groups, and touch data of a node positioned between the peak nodes of the at least two adjacent label groups.

The operation of performing the correction may include an operation of deciding whether to re-segment the one label group into the at least two label groups by determining the existence of at least two bulged portions in a shape of the one label group.

According to another embodiment, a touch sensor apparatus includes at least one processor, executable computer program code, memory storage, and a touch panel including a plurality of nodes for sensing touch. The at least one processor, in conjunction with the executable computer program code and the memory storage, is configured to: select a valid node of the touch panel; determine whether all valid neighboring nodes of the selected node are assigned to a first group, and in response, if all valid neighboring nodes of the selected node are assigned to the first group, assign the selected node to the first group; determine whether each valid neighboring node of the selected node is assigned to a group, and whether some of the valid neighboring nodes of the selected node are assigned to different groups, and in response, if each valid neighboring node of the selected node is assigned to a group, and some of the valid neighboring nodes of the selected node are assigned to different groups, select a group from among the different groups, and assign the selected node to the selected group.

Each valid neighboring node of the selected node may be a node next to the selected node without any other nodes therebetween, and may be a node having touch data that surpasses a particular threshold value.

In one embodiment, the at least one processor, in conjunction with the executable computer program code and the memory storage, is further configured to: determine whether any valid neighboring nodes of the selected node have a touch strength greater than a touch strength of the selected node and are not assigned to any group, and in response, if any valid neighboring nodes of the selected node have a touch strength greater than a touch strength of the selected node but are not assigned to any group, assign any remaining unassigned nodes of the neighboring nodes that have a greater touch strength than a touch strength of the selected node to a group. The at least one processor, in conjunction with the executable computer program code and the memory storage, may be configured to perform the step of assigning any remaining unassigned nodes to one or more respective groups prior to assigning the selected node to a group.

In one embodiment, the at least one processor, in conjunction with the executable computer program code and the memory storage, is further configured to: determine whether the selected node has valid neighboring nodes, and if so, determine whether any of the valid neighboring nodes have a touch strength greater than or equal to the touch strength of the selected node, and if the selected node has valid neighboring nodes, but none of these neighboring nodes have a touch strength greater than or equal to the touch strength of the selected node, assign a new group to the selected node.

The at least one processor, in conjunction with the executable computer program code and the memory storage, may also be configured to select the group from among the different groups by comparing a similarity of the selected node to the different groups, and select the group based on the closest similarity.

In a further embodiment, the at least one processor, in conjunction with the executable computer program code and the memory storage, is further configured to: determine a similarity of the selected node to the different groups by one or more of: for each group, comparing a distance between a peak node of the group and the selected node; and for each group, comparing a value of touch data associated with the group to a value of touch data for the selected node.

In yet another embodiment, a touch sensor apparatus is disclosed. The apparatus includes at least one processor, executable computer program code, memory storage, and a touch panel including a plurality of nodes for sensing touch. The at least one processor, in conjunction with the executable computer program code and the memory storage, is configured to: determine a candidate label for a point node; determine the point node of the touch panel to be a conflict node; store, in the memory storage, a conflict node position of the conflict node; and select the candidate label for the conflict node as the label for the conflict node.

In one embodiment, the at least one processor, in conjunction with the executable computer program code and the memory storage, is further configured to: determine the point node to be the conflict node when two or more candidate labels are determined for the point node.

In one embodiment, the at least one processor, in conjunction with the executable computer program code and the memory storage, is configured to: determine the candidate label for the point node by determining labels of adjacent nodes to the point node.

In one embodiment, the adjacent nodes have touch data greater than touch data of the point node.

In one embodiment, the at least one processor, in conjunction with the executable computer program code and the memory storage, is configured to: select the candidate label for the conflict node based at least on a distance between the conflict node and a peak node.

In another embodiment, the at least one processor, in conjunction with the executable computer program code and the memory storage, is configured to: select the candidate label for the conflict node based at least on a distance between the conflict node and a label group.

BRIEF DESCRIPTION OF THE DRAWINGS

Exemplary embodiments will be more clearly understood from the following detailed description taken in conjunction with the accompanying drawings in which:

FIG. 2B is a diagram illustrating exemplary touch data of each node in a touch sensor panel;

FIGS. 3A through 3E are diagrams illustrating a method of segmenting multiple touches, according to certain exemplary embodiments;

DETAILED DESCRIPTION

Figure 1:
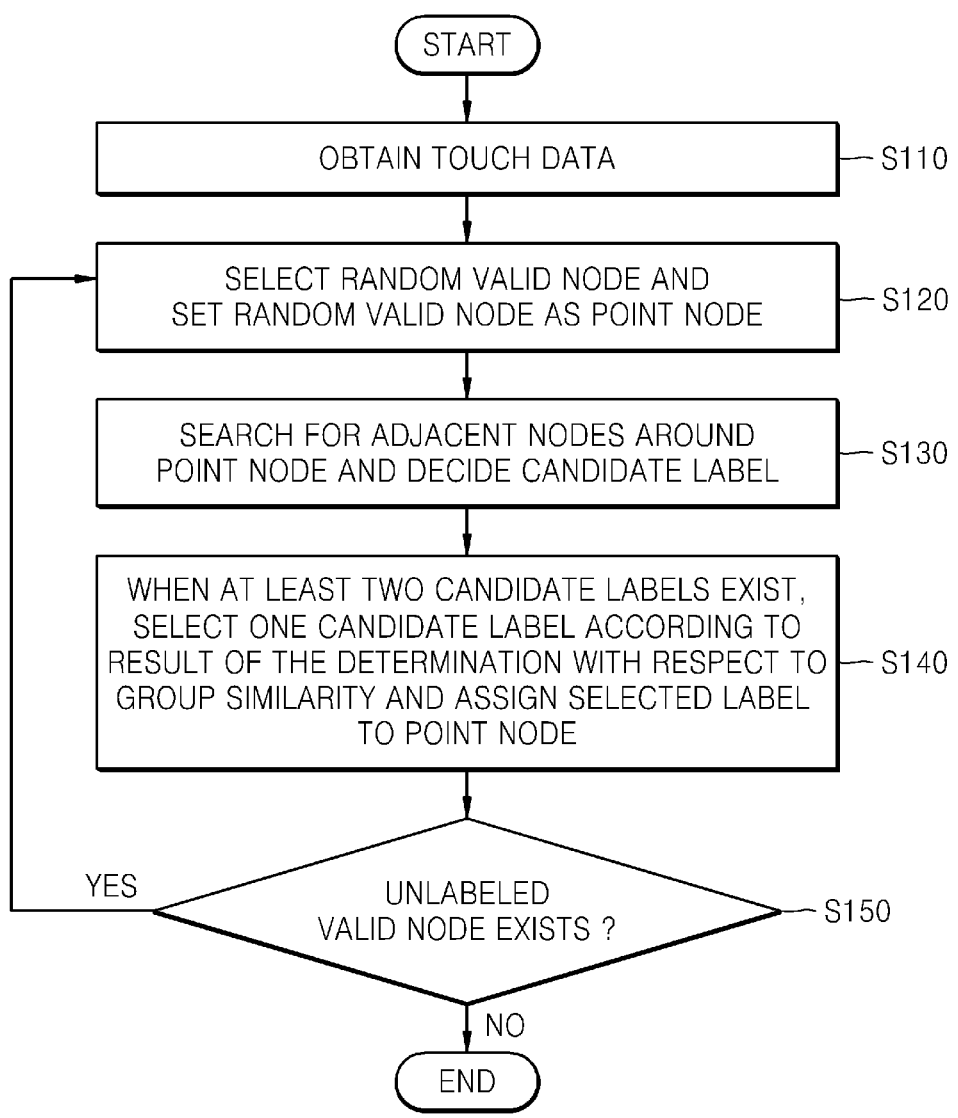
FIG. 1 is a flowchart illustrating a method of segmenting multiple touches in a touch sensing system, according to one exemplary embodiment.

The present disclosure will now be described more fully with reference to the accompanying drawings, in which exemplary embodiments are shown. The disclosed examples may, however, be embodied in many different forms and should not be construed as being limited to the embodiments set forth herein. Thus, the inventive concept may include all revisions, equivalents, or substitutions which are included in the concept and the technical scope discussed herein. Like reference numerals in the drawings denote like elements. In the drawings, various dimensions, such as length, width, and thickness of layers and regions are exaggerated for clarity.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first node could be termed a second node, and, similarly, a second node could be termed a first node without departing from the teachings of the disclosure.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments described herein may be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures have schematic properties, and shapes of regions shown in figures exemplify specific shapes of regions of elements, and the specific properties and shapes do not limit aspects of the invention.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a flowchart illustrating a method of segmenting multiple touches in a touch sensing system, according to one exemplary embodiment.

When a touch occurs in a touch panel, to the touch sensing system can determine whether a valid touch occurs and whether multiple touches occur, and can calculate coordinates of the touch, based on touch data collected by a touch sensor. In particular, in one embodiment, in order to determine the occurrence of multiple touches and to calculate the coordinates of the touch, nodes of the touch panel are segmented into at least one label group based on the touch data. A label group refers to a group of nodes having the same label. According to the method of segmenting multiple touches of FIG. 1, the nodes may be individually labeled and are thus segmented. In one embodiment, the feature of being labeled means that one node is given a unique identification (ID) of a group from among a plurality of groups segmented according to multiple touches, so as to indicate to which group the one node belongs.

Referring to FIG. 1, in one embodiment, a method of segmenting multiple touches includes operations of obtaining touch data (S110), selecting a valid node, such as a random valid node, and setting it as a point node (S120), searching for adjacent nodes of the point node and determining a candidate label (S130), if two or more candidate labels exist, selecting one candidate label according to a result of the determination with respect to group similarity and then labeling the one candidate label on the point node (S140), and determining the existence of unlabeled valid nodes (S150). In operation S150, if there are unlabeled valid nodes, all of the valid nodes are labeled by repeating operations S120 through S140 of the method.

Figure 2A:
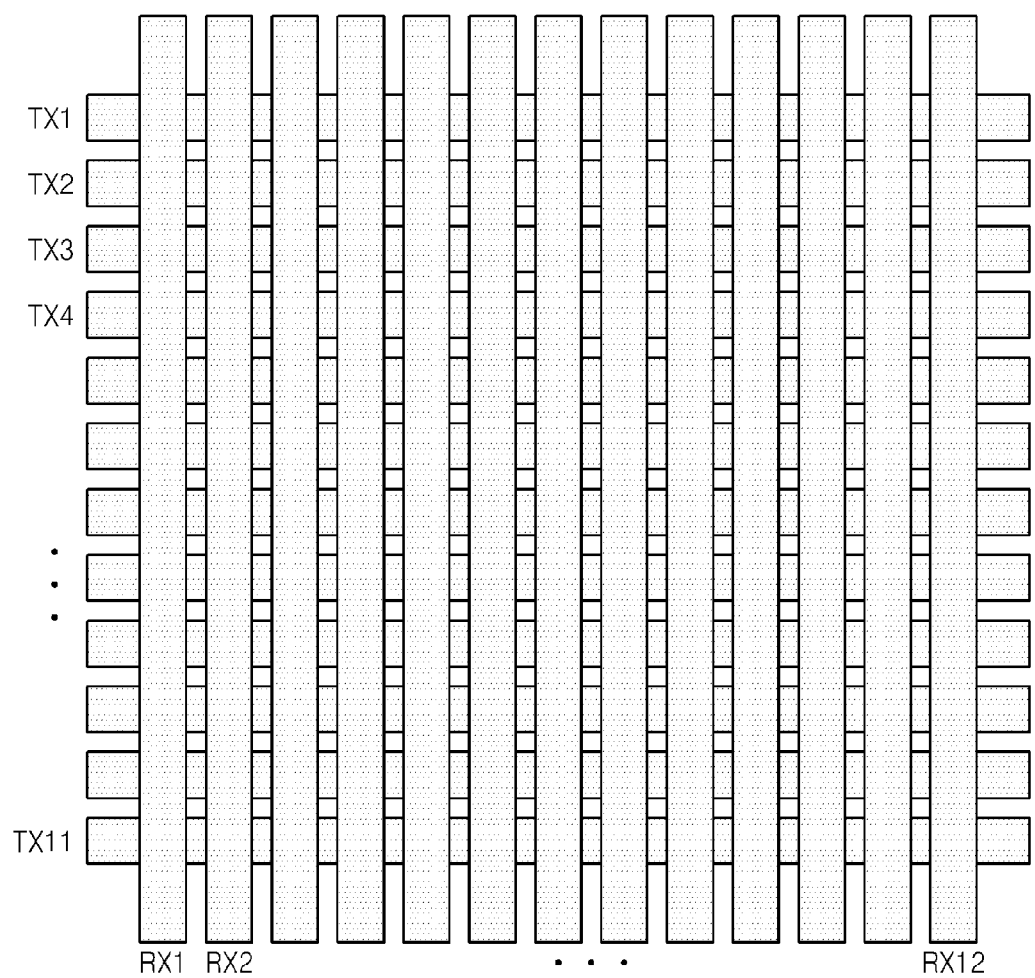
FIG. 2A is a diagram illustrating an exemplary touch sensor.

Hereinafter, each operation in the flowchart of FIG. 1 is described in detail. First, in the operation of obtaining touch data (S110), when a touch occurs on a touch panel, touch data of each node on the touch panel is obtained. The touch panel may be a mutual capacitive-type touch panel as shown in FIG. 2A. Referring to FIG. 2A, the mutual capacitive-type touch panel includes a plurality of driving electrodes TX1 through TX11 and a plurality of receiving electrodes RX1 through RX12. Although FIG. 2A illustrates the mutual capacitive-type touch panel including 11 driving electrodes and 12 receiving electrodes, the number of driving electrodes and receiving electrodes may be changed. Also, a shape of a driving electrode and a receiving electrode may vary.

In one embodiment, the driving electrodes TX1 through TX11 and the receiving electrodes RX1 through RX12 cross each other, so that mutual capacitances are electrically generated between the driving electrodes TX1 through TX11 and the receiving electrodes RX1 through RX12. In this regard, the cross points at which the mutual capacitances are generated by the driving electrodes TX1 through TX11 and the receiving electrodes RX1 through RX12 may be defined as nodes. For example, as illustrated in FIG. 2B, the nodes in the touch panel may be a matrix array. For convenience of description, each node is indicated as combination of a row and a column. For example, a node at a fourth row and a third column on the touch panel is indicated as a node (4, 3). Each node may have one or more neighboring nodes. For example, a neighboring node of a first node may include any node that can be connected to the first node by a straight line that does not pass through any other nodes, and may include nodes next to the first node with no intervening nodes therebetween.

By applying a constant voltage pulse to the driving electrodes TX1 through TX11 and by collecting charges corresponding to the voltage pulse by the receiving electrodes RX1 through RX12, it is possible to measure capacitances of points at which the driving electrodes TX1 through TX11 and the receiving electrodes RX1 through RX12 cross each other. In one embodiment, when a conductor such as a finger or a stylus pen approaches the nodes, an electric field occurs so that the capacitances decreases. In this regard, by measuring the decreased capacitances, it is possible to obtain touch data of each node as shown in FIG. 2B. For example, touch data of a node (3, 5) is 21, and touch data of a node (5, 6) is 107. The touch data referred to herein may indicate a difference in capacitance values. For example, a touch data of 0 may indicate no touch, or no change in capacitance, and a touch data of higher numbers can indicate a stronger touch, or larger change in capacitance. In one embodiment, the values shown in the figures relating to touch data indicate a touch strength of one or more touches for each node. The tough strength may depend on a change in capacitance (e.g., with a greater change in capacitance corresponding to a greater touch strength), and may depend on other factors that indicate a likelihood that an actual touch has occurred. In addition, the same principles could apply in a system that does not use a capacitive-type touch panel, such that a touch strength is determined and the relative touch strengths between areas not being touched and areas being touched are used to determine labeling.

Next, in the operation of selecting a random valid node and setting it as a point node (S120), a random valid node from among unlabeled valid nodes is selected and then is set as a point node. The point node means a node on which labeling is performed (e.g., the selected node). In a case where a node on which labeling is performed is set as a first point node, and after that, if a node that is required to be labeled prior to the first point node exists while the first point node is being labeled, the node may be set as a new point node, e.g., a second point node.

The valid node means a node having touch data that surpasses a particular value, such as touch data equal to or greater than a threshold value, such as a critical threshold value. A valid node may correspond to a node that has likely been touched. In the touch panel, a mutual capacitance of a node on which an actual touch does not occur may be changed due to a noise component. In that case, a change amount of the mutual capacitance of the node on which the actual touch does not occur may be small, so that its touch data may be small. In some cases, it is desirable to ignore such noise-induced touch data. As a result, for greater accuracy and exactness of touch coordinates, it is useful to label only a valid node having touch data equal to or greater than a critical threshold value, and to not label noise components. Thus, valid nodes are determined based on touch data, and a random node from among the unlabeled valid nodes is selected and then is set as a point node.

Referring to FIG. 3A, if a threshold value is 15, nodes that have a touch data less than 15 are determined as invalid nodes, and nodes that have touch data equal to or greater than 15 are determined as valid nodes. The threshold value can be set to a critical threshold value, for example, a value below which it is decided that no actual touch has occurred. Although a node (2, 1) and a node (2, 2) are adjacent nodes (e.g., nodes (2, 1) and (2, 2) are next to each other with no intervening nodes therebetween), touch data of the node (2, 1) is 5 that is less than the critical value, so that the node (2, 1) is an invalid node, but touch data of the node (2, 2) is 36 that is greater than 15, so that the node (2, 2) is a valid node.

FIG. 3B illustrates a result of determining the invalid nodes and the valid nodes based on touch data of a node when the critical value is 15. In FIG. 3B, nodes that are marked as a gray color are the invalid nodes with touch data less than 15, and nodes that are marked as a white color are the valid nodes with touch data equal to or greater than 15. From among the valid nodes, a node that is not labeled is set as a point node. Here, after the valid nodes and the invalid nodes are previously divided, it is possible to set the point node by selecting a random node from among the valid nodes. However, it is also possible to set the point node by sequentially scanning nodes, and then by determining whether a corresponding node is a valid node and is labeled.

Referring back to FIG. 1, after the operation of selecting a valid node and setting it as a point node (S120), adjacent nodes around the point node are searched for and thus a candidate label is determined (S130). For example, in one embodiment, all neighboring nodes are searched for. The candidate label refers to a potential label to be selected as a label of the point node. The candidate label may be a label assigned to all of the adjacent nodes around the point node. Alternatively, the candidate label may a label of adjacent nodes that are from among the adjacent nodes around the point node and that satisfy a predetermined condition. For example, the candidate label may be a label of adjacent nodes that are from among the adjacent nodes around the point node and that have touch data, or touch strength, greater than touch data or touch strength of the point node. Referring to FIG. 3C, nodes from among valid nodes, except for a node (2, 2) and a node (3, 4), are labeled with a label 1 or a label 2. In order to label the node (2, 2) with touch data that is 36, the node (2, 2) is set as a first point node. When adjacent nodes around the first point node are searched for, nodes with touch data greater than the first point node are a node (3, 2) with touch data that is 128, and a node (3, 3) with touch data that is 102. In this regard, since the node (3, 2) and the node (3, 3) are all labeled with the label 1, the label 1 is determined as the candidate label of the first point node.

In a case where the node (3, 4) with touch data that is 82 is the first point node, adjacent nodes around the node (3, 4) are searched for to select adjacent nodes with touch data greater than that of the first point node. Touch data of the node (3, 3) is 102, and touch data of a node (3, 5) is 101, so that the touch data of the node (3, 3) and the node (3, 5) is greater than that of the first point node. In this regard, the node (3, 5) is labeled with the label 1 and the node (3, 3) is labeled with the label 2. Thus, the label 1 and the label 2 may be determined as the candidate label.

FIG. 3C corresponds to a case in which neighboring, adjacent nodes around a point node, i.e., a node to be labeled, are all labeled. However, in a case where an adjacent node that is from among adjacent nodes around a point node and that has touch data greater than touch data of the point node is not labeled, the adjacent node may be labeled prior to the point node, and then the candidate label may be decided. Alternatively, in a case where at least one of adjacent nodes of the point node are not labeled, the at least one unlabeled adjacent node may be labeled and then the candidate label may be decided. However, conditions related to deciding the candidate label may vary.

Next, when two or more candidate labels exist, one candidate label from among the labels is selected according to a result of the determination with respect to group similarity and then is assigned to the point node (S140). For example, the group similarity between a group of nodes on which a candidate label is labeled (hereinafter, referred to as a 'label group') and the point node is determined, and one candidate label of a label group that has the highest group similarity with the point node may be selected as a label of the point node. Here, the group similarity is a relative index indicating which label group from among label groups of the candidate labels is appropriate to include for the point node. The group similarity may be determined based on various conditions. For example, the group similarity may be determined based on a distance on the touch panel between the point node and the peak node of label group labeled with a candidate label. Here, a peak node refers to a node having the greatest touch data (e.g., highest touch strength) from among valid nodes included in one label group. Also, or alternatively, the group similarity may be determined based on a distance between the label group and the point node (e.g., a distance between the point node and a physical center or average-touch-strength center of the label group), a difference between touch data of the peak node of the label group and touch data of the point node, a difference between the touch data of the point node and touch data of the adjacent node included in the label group, or the like. In addition, the group similarity may be determined by combining the aforementioned determination methods. For example, different ones of the determination methods may be given priority over others or may be weighted with certain factors in order to determine the group similarity. However, determination of the group similarity is not limited to the aforementioned determination methods and thus examples of the determination of the group similarity may vary.

For example, in a case where the node (3, 4) is set as a first point node in FIG. 3C, the label 1 and the label 2 are the candidate labels, so that the group similarity between the first point node and each of a first label group and a second label group that are labeled with the label 1 and the label 2, respectively, is determined. When the group similarity is determined by a distance between a peak node and a point node, a peak node of the first label group is a node (3, 2) with touch data that is 128, and a peak node of the second label group is a node (3, 5) with touch data that is 101. When a distance between each of the peak nodes and the node (3, 4) that is the first point node is determined, the node (3, 5) is closer to the first point node. Thus, the group similarity with the second label group is greater than that of the first label group. Accordingly, the label 2 is determined as a label of the first point node. Therefore, the label 2 is assigned to the node (3, 4).

Referring back to FIG. 1, when the label of the point node is decided (S140), it is determined whether there is an unlabeled valid node from among other valid nodes (S150). If an unlabeled valid node exists, a node (e.g. a random node, or a node selected according to a particular selection order) from among the unlabeled valid nodes is selected as a point node, and then labeling is performed according to the aforementioned operations. When operations S120 through S140 of FIG. 1 are repeated until there are no unlabeled valid nodes from among the valid nodes, all of the valid nodes are labeled as illustrated in FIG. 3D, and as a result, nodes are segmented into predetermined label groups based on labels that are labeled on the valid nodes, respectively. The nodes may be segmented into groups simply based on having different labels. Alternatively, a segmenting process may be performed where labeled nodes are scanned, and the nodes having a first label are associated with a first touch, and nodes having a second label are associated with a second touch, thereby segmenting the nodes into groups that correspond to different touches.

The aforementioned corresponds to a case in which the candidate labels for the point node are two labels, and in this regard, in a case where candidate labels for a point node are three or more labels, a label that is from among candidate labels and that is to be assigned to the point node may be decided by determining group similarity.

FIG. 3E is a diagram illustrating an exemplary method of segmenting multiple touches of the flowchart of FIG. 1, which corresponds to a case in which candidate labels for a point node are three or more labels.

Referring to FIG. 3E, valid nodes except for a current node (3, 4) are labeled with one of a label 1, a label 2, and a label 3. The node (3, 4) is set as a first point node (S120), and adjacent nodes are searched for to select adjacent nodes with touch data greater than touch data of the first point node. The adjacent nodes with touch data greater than the touch data of the first point node are a node (3, 3), a node (2, 4) and a node (3, 5), and the label 1, the label 2, and the label 3 that are labeled on the nodes are decided as candidate labels for the first point node (S130). Since the candidate labels are two or more labels, group similarity between the first point node and each of the label groups including the candidate labels is determined, and then one candidate label is selected. According to one of the examples of the determination with respect to the group similarity, touch data of a peak node of each label group may be compared with touch data of the first point node, and the label group including a peak node with touch data that is the most similar to the touch data of the first point node may be determined as a group having the highest group similarity. Touch data of a node (1, 4) that is a peak node of a first label group is 99, and touch data of a node (3, 2) that is a peak node of a second label group is 128. Also, touch data of a node (3, 5) that is a peak node of a third label group is 101. In one embodiment, since touch data of the first point node is 82, a difference between the touch data of the peak node of the first label group, and the touch data of the first point node is smallest. Thus, the first label group may be determined as a group having the highest group similarity, and the label 1 from among the candidate labels is selected and then is assigned to the node (3, 4) that is the first point node (S140). Since there are no more unlabeled valid nodes, labeling on the valid nodes is ended, and then the valid nodes are segmented into three label groups.

Figure 4:
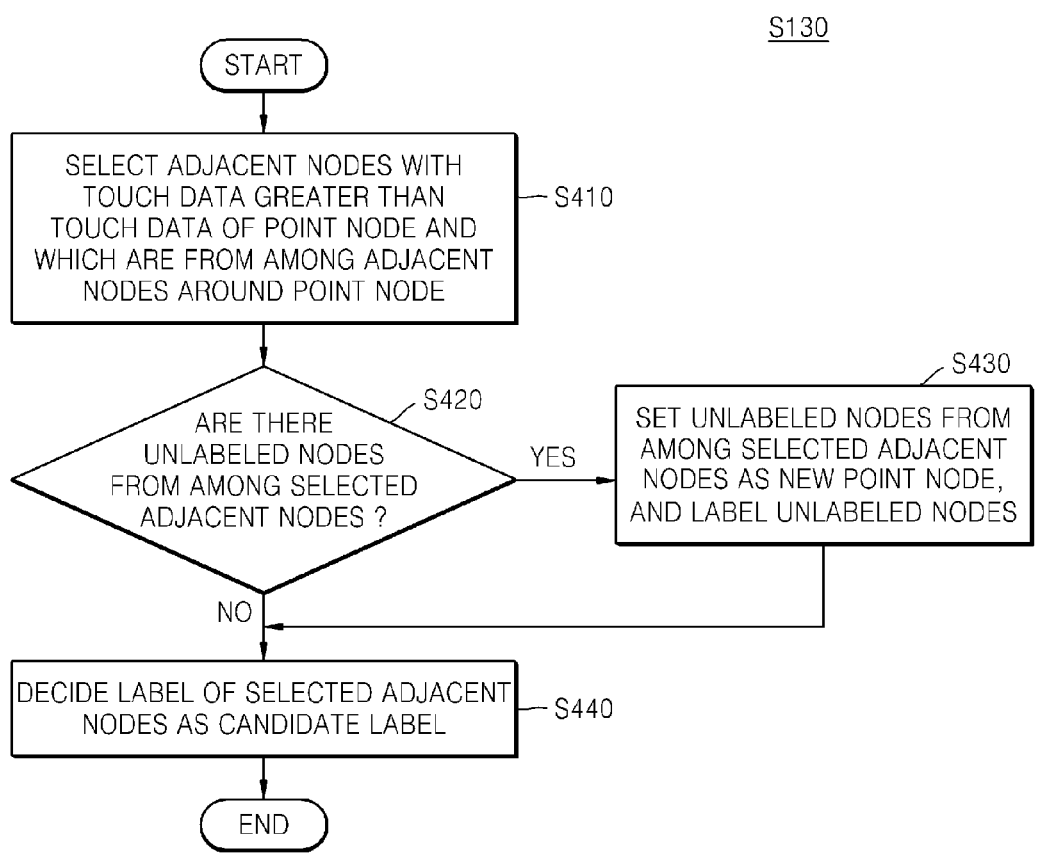
FIG. 4 is a flowchart illustrating in detail an operation of determining a candidate label in the method of FIG. 1, according to one exemplary embodiment.

FIG. 4 is a flowchart illustrating in detail the operation of determining a candidate label (S130) in the method of FIG. 1, according to one exemplary embodiment.

Referring to FIG. 4, adjacent nodes around a point node are searched for to select adjacent nodes with touch data greater than touch data of the point node (operation S410). As illustrated in FIG. 3A, if nodes are arrayed in a matrix, 8 nodes around the point node may be determined as the adjacent nodes. However, this is an example, and thus a range of the adjacent nodes may be changed according to an array shape of nodes or intention of a designer. In one embodiment, if no adjacent nodes with touch data greater than the touch data of the point node exist, it is determined that there is no candidate label corresponding to the point node.

Next, it is determined whether there is an unlabeled node from among the selected adjacent nodes (operation S420). If there is an unlabeled node from among the selected adjacent nodes, the unlabeled adjacent node is set as a new point node and is labeled (operation S430). In the operation S430, the unlabeled adjacent node may be labeled according to the operation of determining a candidate label (S130) and the operation of labeling a point node (S140).

When the selected adjacent nodes are all labeled, labels of the selected adjacent nodes are decided as candidate labels to be assigned to the point node (operation S440).

As described above, in one embodiment, a label that is labeled on the adjacent node with touch data greater than touch data of the point node is decided as a candidate label for the point node, so that the candidate label for the point node has to be decided after the labels of the selected adjacent nodes are all decided. Thus, when there are selected adjacent nodes that are not labeled, the unlabeled selected adjacent nodes are set as new point nodes, e.g., second point nodes, and labeling is performed thereon. In this regard, after the second point nodes are all labeled, i.e., after the selected adjacent nodes are all labeled, the candidate label for the point node is decided. If after all adjacent nodes are labeled, none have touch data higher than the point node, in one embodiment, the point node may be then labeled with a new group label.

Figure 5:
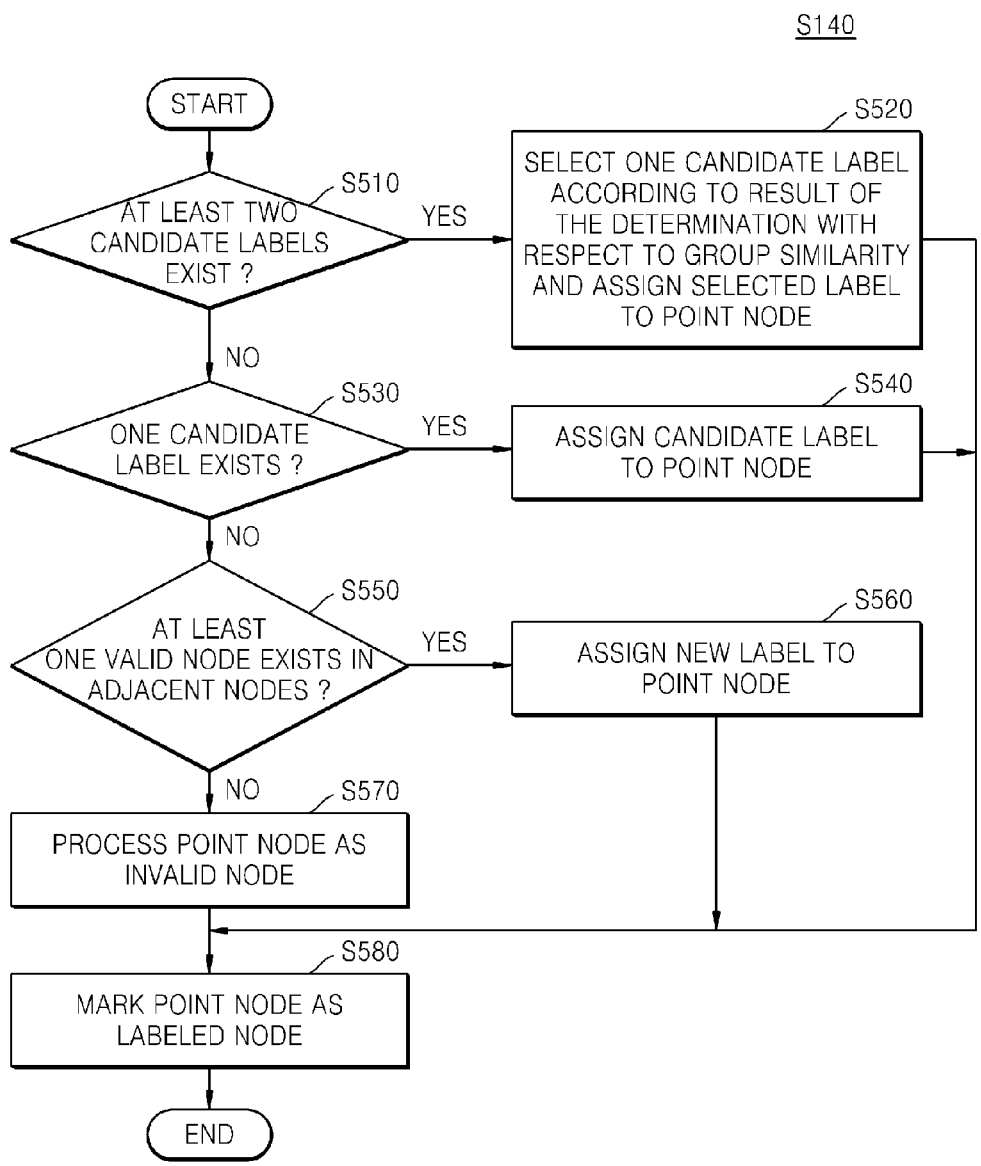
FIG. 5 is a flowchart illustrating in detail an operation of labeling a point in the method of FIG. 1, according to one exemplary embodiment.

FIG. 5 is a flowchart illustrating in detail the operation of labeling a point node (S140) in the method of FIG. 1, according to one exemplary embodiment.

When the candidate label for the point node is decided according to the feature described above with reference to FIG. 4, it is determined whether the number of candidate labels is at least two (operation S510). If the candidate label includes two or more candidate labels, group similarity between the point node and each of the node groups labeled with the candidate labels is determined, one candidate label of the candidate labels is selected, and then the selected candidate label is assigned to the point node (operation S520). Here, when there are unlabeled adjacent nodes from among adjacent nodes around the point node, the operation of labeling a point node may further include an operation of labeling the unlabeled adjacent nodes. For example, after the adjacent nodes around the point node are all labeled, the group similarity between the point node and each of the node groups labeled with the candidate labels may be determined. The operation of labeling the unlabeled adjacent nodes may be the same as the operation of determining a candidate label (S130) and the operation of labeling a point node (S140). Thus, detailed descriptions thereof are omitted.

If the point node does not include at least two candidate labels, it is determined whether there is only one candidate label (operation S530). If there is only one candidate label, the candidate label is assigned to the point node (operation S520).

When it is determined that there is no candidate label, it is determined whether at least one valid node exists in the adjacent nodes around the point node (operation S550). In one embodiment, if at least one valid node exists in the adjacent nodes around the point node, but it has a lower touch data value than the point node, a new label is assigned to the point node (operation S560), and if a valid node does not exist in the adjacent nodes around the point node, the point node is processed as an invalid node (operation S570). For example, a label 0 may be assigned to the point node, so that the point node is processed as an invalid node.

The fact that a valid node does not exist in the adjacent nodes means that none of the adjacent nodes has touch data that is greater than touch data of the point node. In one embodiment, if at least one adjacent node from among the adjacent nodes is a valid node, then the point node is a node having the greatest variation in physical quantity from among nodes with physical quantity changed on a touch panel due to the same touch, i.e., from among nodes with mutual capacitances that decrease. There is a high possibility that the point node and the adjacent nodes around the point node are labeled with the same label. Also, a node, e.g., the point node, with touch data greater than touch data of the adjacent nodes around the point node is defined as a peak node.

On the other hand, if the adjacent nodes around the point node are all invalid nodes, although the touch data of the point node may be equal to or greater than a critical value, there is a high possibility that the touch data is not incurred by an actual touch but is incurred by noise. Thus, in one embodiment, the point node in this situation is processed as an invalid node.

In the flowchart of FIG. 5, it is determined whether there are two or more candidate labels (operation S510), and then it is sequentially determined whether there is only one candidate label if there are not two or more candidate labels (operation S530). However, an order of the operations is not limited thereto. The operation of determining whether there are two or more candidate labels (operation S510) and the operation of determining whether there is only one candidate label (operation S530) may be simultaneously performed, for example. In certain embodiments, the number of candidate labels is decided, and then subsequent operations S520, S540, S560, and S570 may be selectively performed according to the number of candidate labels.

As described above, in one embodiment, when the point node is labeled according to a number of candidate labels, a marking operation is performed to indicate that the point node is already labeled (operation S580).

Hereinafter, an example of the method of segmenting multiple touches in the flowcharts of FIGS. 1, 4, and 5 is described with reference to FIG. 3A.

It is assumed that a critical value is 15, and none of the valid nodes are labeled yet. A scanning operation is performed from a node (1, 1) so as to search for unlabeled nodes from among the valid nodes. Since a node (2, 2) is the first scanned valid node that is not labeled, the node (2, 2) is set as a point node (operation S120 of FIG. 1). The node (2, 2) is a current node on which labeling is performed at a current time, so that the node (2, 2) is set as a first point node.

Eight adjacent nodes around the first point node are searched for to find a candidate label. As a result, a node (3, 2) and a node (3, 3) that are from among the adjacent nodes and that have touch data greater than touch data of the first point node (indicating a higher touch strength than the first point node) are selected (operation S410 of FIG. 4).

It is determined whether any one of the node (3, 2) and the node (3, 3) is not labeled (operation S420 of FIG. 4). Since all of the node (3, 2) and the node (3, 3) are not labeled yet, the node (3, 2) and the node (3, 3) are set as new point nodes, e.g., second point nodes, and then are labeled (operation S430).

The labelling on the new point nodes may be performed according to the operation of determining a candidate label for a point node (operations of the flowchart of FIG. 4) and the operation of labeling a point node (operations of the flowchart of FIG. 5). First, a label of the node (3, 2) is decided. For the decision, the node (3, 2) is set as the second point node and its adjacent, neighboring nodes are searched for (operation S410). Since none of the adjacent nodes have touch data greater than touch data of the node (3, 2), there is no candidate label. Since there is no candidate label and there are 6 valid nodes from among the 8 adjacent nodes, the node (3, 2) is a peak node. Thus, a new label 1 is assigned to the node (3, 2) (operation S560). The label 1 is assigned to the node (3, 2), and a marking operation is performed to indicate that the node (3, 2) is a labeled node (operation S580). For example, a processor for the touch panel may create a log of entries for each node, indicating when that node has been labeled and indicating which label it has been assigned.

Next, the node (3, 3) is set as the second point node and its adjacent nodes are searched for (operation S410). From among the adjacent nodes, the node (3, 2) is greater than the node (3, 3). Thus, the label 1 of the node (3, 2) is decided as the candidate label (operation S440). Since only one candidate label exists, the label 1 is assigned as a label of the node (3, 3) (operation S550), and a marking operation is performed to indicate that the node (3, 3) is labeled (operation S560).

Through the aforementioned processes, the node (3, 2) and the node (3, 3) that are the selected adjacent nodes around the node (2, 2) that is the point node are all labeled, so that the method returns to the node (2, 2) and then determines the candidate label (operation S440). The labels of the node (3, 2) and the node (3, 3) that are the selected adjacent nodes are the label 1. Since there is only one candidate label, the label 1 is decided as a label of the first point node. Thus, the label 1 is assigned to the node (2, 2) (operation S540).

By scanning nodes again, an unlabeled node, which may be a randomly selected node, from among the valid nodes is selected and set as a point node (operation S120 of FIG. 1). In this regard a node (2, 3) is set as a first point node. Adjacent nodes around the first point node are searched for and thus the node (2, 2), the node (3, 2), the node (3, 3), and a node (3, 4) that have touch data greater than touch data of the node (2, 3) are selected (operation S410 of FIG. 4). It is determined that the node (2, 2), the node (3, 2) and the node (3, 3) are labeled with the label 1, but the node (3, 4) is not labeled (operation S420). Thus, the node (3, 4) is set as a second point node and then is labeled (operation S430). In order to label the second point node, adjacent nodes around the node (3, 4) that is the second point node are searched for and then the node (3, 3) and a node (3, 5) that have touch data greater than touch data of the second point node are selected (operation S410). In this regard, the node (3, 3) is labeled but the node (3, 5) is not labeled, so that the node (3, 5) is set as a third point node and then is labeled (operation S430). In order to label the third point node, adjacent nodes around the third point node are searched for, and adjacent nodes having touch data greater than touch data of the third point node are selected (operation S410). However, none of the adjacent nodes have touch data, greater than the touch data of the third point node, and at least one of the adjacent nodes is a valid node, so that the node (3, 5) is a peak node. Thus, a new label is assigned to the node (3, 5) (operation S560). Since the label 1 is labeled on another valid node, a label 2 that is a new label is assigned as a label of the node (3, 5).

Since the label of the third point node is decided as the label 2, the method returns to the node (3, 4) and decides a candidate label for the second point node. Since the candidate label includes two labels, i.e., the label 1 aid the label 2, group similarity between the node (3, 4) that is the second point node, and each of a label group of the label 1 and a label group of the label 2 is determined. In one embodiment, the group similarity is determined based on a distance between a peak node and the second point node. In this regard, a peak node of the label group labeled with the label 1 is the node (3, 2), and a peak node of the label group labeled with the label 2 is the node (3, 5). Since the node (3, 5) is closer to the node (3, 4) that is the second point node, it is possible to determine that the label group labeled with the label 2 has higher group similarity with the second point node. Thus, the label 2 is selected as the label of the node (3, 4) that is the second point node, and is assigned to the node (3, 4).

Since the label of the second point node is decided as the label 2, the method returns to the node (2, 3) that is the first point node, and then decides a candidate label. From among the selected adjacent nodes, the node (2, 2), the node (3, 2) and the node (3, 3) are labeled with the label 1, and the node (3, 4) is labeled with the label 2, so that the label 1 and the label 2 become the candidate labels, and then in one embodiment the group similarity is determined based on a distance between the peak node and the first point node. As a result, it is determined that the label group labeled with the label 1 has higher group similarity with the first point node. Thus, the label 1 is selected as the label of the node (2, 3) that is the first point node, and the label 1 is assigned to the node (2, 3).

Other valid labels are labeled in the aforementioned manner. By doing so, the valid nodes may be segmented into the label group labeled with the label 1 and the label group labeled with the label 2, as shown in FIG. 3D. In one embodiment, the same criteria is used throughout a labeling process to determine group similarity (e.g., a distance between a peak node and a point node in the example above).

Above, the method of segmenting multiple touches is described in detail with reference to an example of FIG. 3A. However, one or more embodiments are not limited to the example. For example, a label of a point node may be selected after adjacent nodes around the point node are all labeled, or various conditions may be considered to determine the group similarity.

Figure 6:
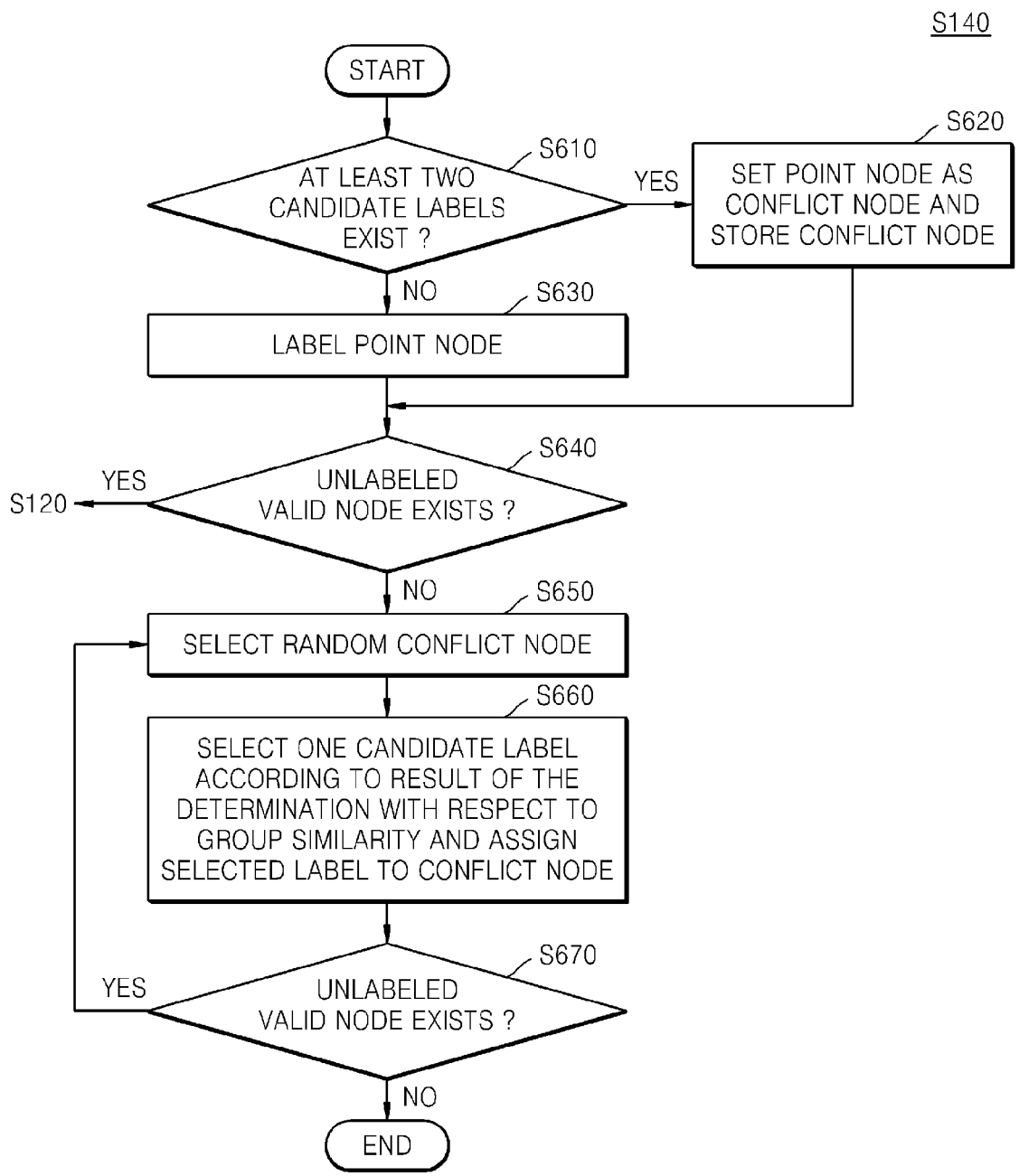
FIG. 6 is a flowchart illustrating in detail the operation of labeling a point in the method of FIG. 1, according to another exemplary embodiment.

FIG. 6 is a flowchart illustrating in detail the operation of labeling a point node (S140) in the method of FIG. 1, according to another exemplary embodiment.

When the candidate label for the point node is decided according to the feature described above with reference to FIG. 4, it is determined whether the number of candidate labels is at least two (operation S610). If the candidate label includes two or more candidate labels, the point node is set as a conflict node and then the conflict node is stored (operation S620).

If the candidate label does not include two or more candidate labels, the point node is labeled (operation S640). This labeling may be the same as labeling operations with respect to a case of one candidate label or a case of zero candidate labels in the flowchart of FIG. 5 (operations S530 through S570).

Next, it is determined whether there is an unlabeled valid node from among valid nodes except for the conflict node (operation S640). If there is an unlabeled valid node, the valid node is labeled. Thus, a process of selecting the valid node as a point node and labeling the point node is repeated. With respect to the unlabeled valid node, operations S120 through S130 of FIG. 1, and operations S610 through S630 of FIG. 6 are repeated. In this process, nodes having two or more candidate labels may be set as conflict nodes and then stored, and the rest of the nodes may be labeled with a particular label.

After all of the valid nodes except for the conflict nodes are labeled, the conflict nodes are labeled.

A random conflict node may be selected (operation S650). Afterward, group similarity between a label group and the selected conflict node is determined, and one candidate label is selected and then is assigned to the selected conflict node (operation S660). The determination of the group similarity may be performed in the same manner as the determination of the group similarity between a point node and each of the node groups labeled with the candidate labels, respectively, as shown in FIG. 1. Thus, detailed descriptions thereof are omitted here.

When the selected conflict node is labeled, it is determined whether there is an unlabeled conflict node (operation S670).

If the unlabeled conflict node exists, the aforementioned labeling operations S650 and S660 are repeated.

Figure 7:
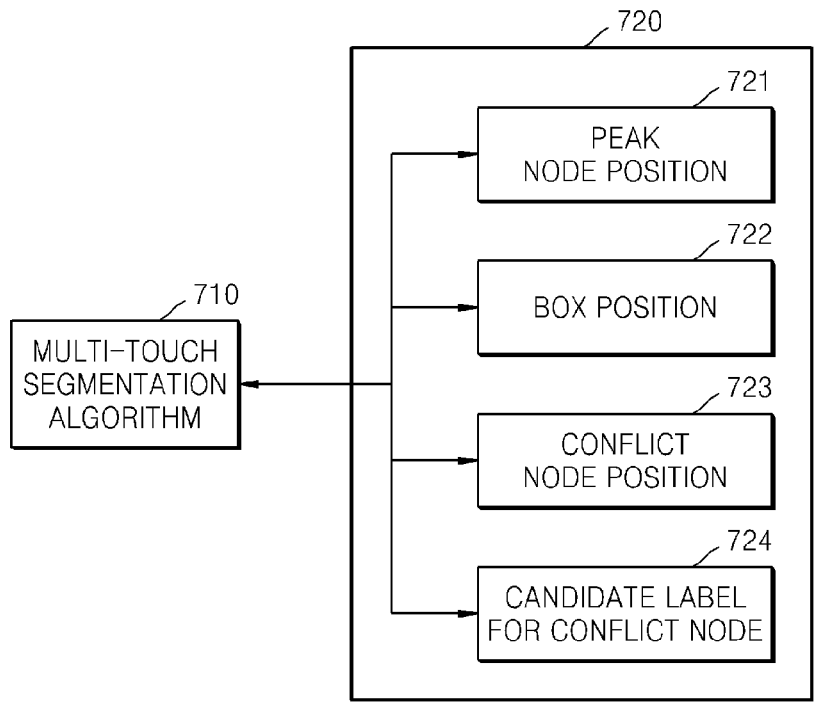
FIG. 7 is a block diagram illustrating a configuration used to perform a method of segmenting multiple touches, according to one exemplary embodiment.

FIG. 7 is a block diagram illustrating a configuration used to perform a method of segmenting multiple touches, according to one embodiment.

In order to perform the method of segmenting multiple touches, a multi-touch segmentation algorithm 710 is performed and a plurality of pieces of performance information 720 are arranged.

In one embodiment, the multi-touch segmentation algorithm 710 is an algorithm that implements operations of the methods of FIGS. 1, 4, 5, and 6, and the plurality of pieces of performance information 720 are generated during execution of the multi-touch segmentation algorithm 710 and then are stored in a memory or other storage region. The multi-touch segmentation algorithm 710 may be performed by one or more processors using software, such as one or more programs using executable computer program code written in one or more computer readable code languages. The one or more processors may be in communication with the memory or other storage region. The plurality of pieces of performance information 720 may be stored in a memory and may be accessed and used during execution of the multi-touch segmentation algorithm 710.

The performance information 720 may include a peak node position 721, a box position 722, a conflict node position 723, a candidate label for conflict node 724, and the like. For example, when an approximate range of a label group that is a group of nodes labeled with the same label is defined as a rectangle having a minimum size capable of including all nodes of the label group, the box position 722 indicates a position of the rectangle on a touch panel. For example, the position of the rectangle of the label group may indicate positions of nodes at an upper-left point and a lower-right point or positions of nodes at an upper-right point and a lower-left point. Referring to FIG. 3C, the box position 722 of the label group corresponding to the label 1 may be (2, 1) and (4, 3).

When a node is decided as a peak node during execution of the multi-touch segmentation algorithm 710, and a new label is assigned, the peak node position 721 is stored. Also, whenever each node is labeled, the box position 722 of a corresponding label is stored. The stored peak node position 721 and the box position 722 may be accessed and used to determine a distance to a peak node, a distance to a label group, or the like when group similarity between point nodes and label groups is determined.

Also, according to the operation S620 of FIG. 6, when the point node is the conflict node, the conflict node, the conflict node position 723, and a candidate label 724 for the conflict node are stored, and the stored information may be used to determine a label of the conflict node.

Figure 8:
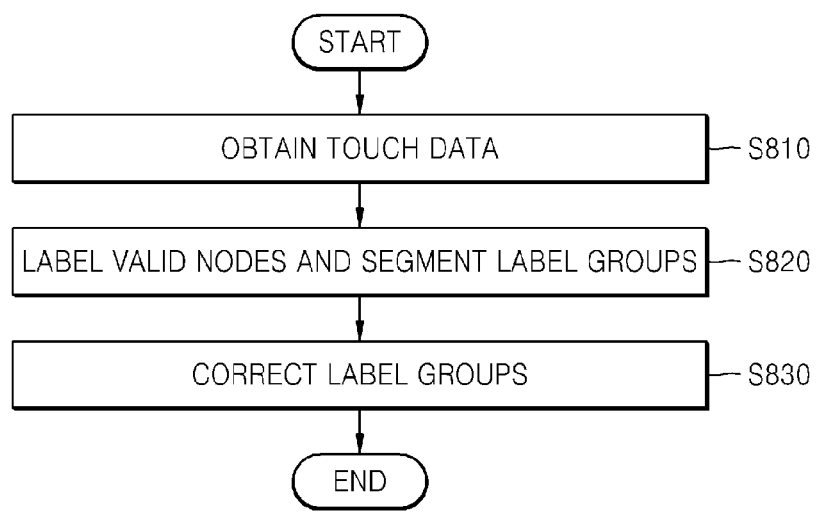
FIG. 8 is a flowchart illustrating a method of segmenting multiple touches, according to another exemplary embodiment.

FIG. 8 is a flowchart illustrating a method of segmenting multiple touches, according to another exemplary embodiment.

The method of segmenting multiple touches of FIG. 8 includes operations of obtaining touch data (S810), labeling valid nodes and segmenting label groups (S820), and correcting the label groups (S830).

The operations of obtaining touch data (S810) and segmenting label groups (S820) may be the same as the operations S110 through S150 in the method of FIG. 1. Thus, detailed descriptions thereof are omitted.

The method of segmenting multiple touches of FIG. 8 further includes the correction operation (S830) in which, after the valid nodes are all labeled and nodes that are labeled with corresponding labels are segmented into corresponding label groups, the label groups are combined or re-segmented. Here, one label group may correspond to occurrence of one touch.

When one touch occurs on a touch panel of a touch sensor system, if valid nodes are segmented into two label groups and thus it is determined as occurrence of two touches, or conversely, when valid nodes with respect to multiple touches are grouped into one label group and thus it is determined as occurrence of one touch, and if touch coordinates are calculated according to the occurrences, an electronic device having a multi-touch system may perform an operation different from a user's intention. Thus, in order to increase exactness of multi-touch segmentation, the correction operation (S830) is performed to combine the label groups or to re-segment one label group into two or more label groups, according to a predetermined condition.

Figure 9:
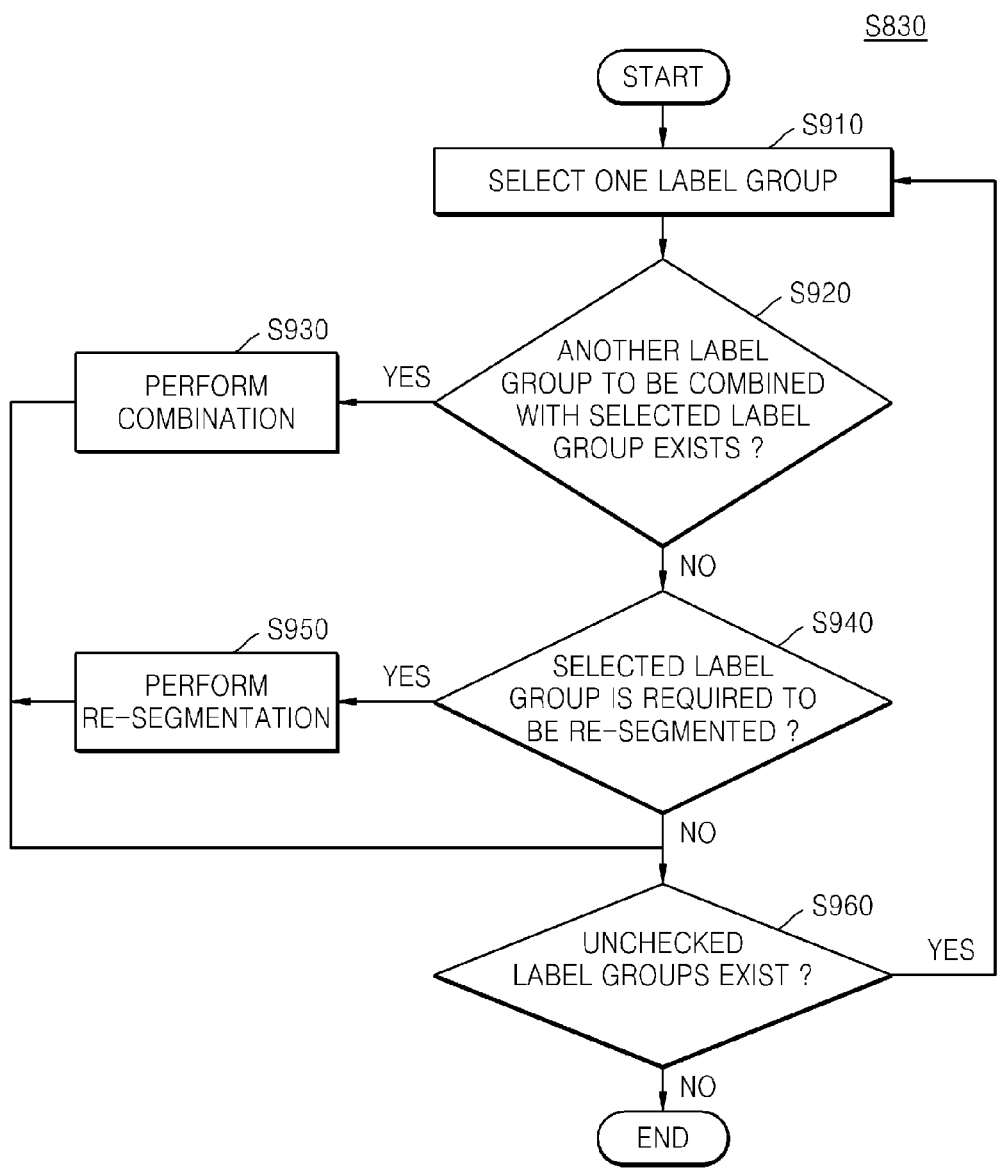
FIG. 9 is a flowchart illustrating a method of segmenting multiple touches, according to another exemplary embodiment.

FIG. 9 is a flowchart illustrating a method of segmenting multiple touches, according to another exemplary embodiment.

Referring to FIG. 9, after label groups are segmented according to a label of a valid node, one of the label groups is selected (operation S910).

It is determined whether there is a label group required to be combined with the selected label group (operation S920). The request for combination may be determined according to various methods. For example, whether or not to combine label groups may be determined by comparing touch data of a node positioned between a peak node of the selected label group and a peak node of a label group adjacent to the selected label group, and touch data of each of the two peak nodes.

Figure 10:
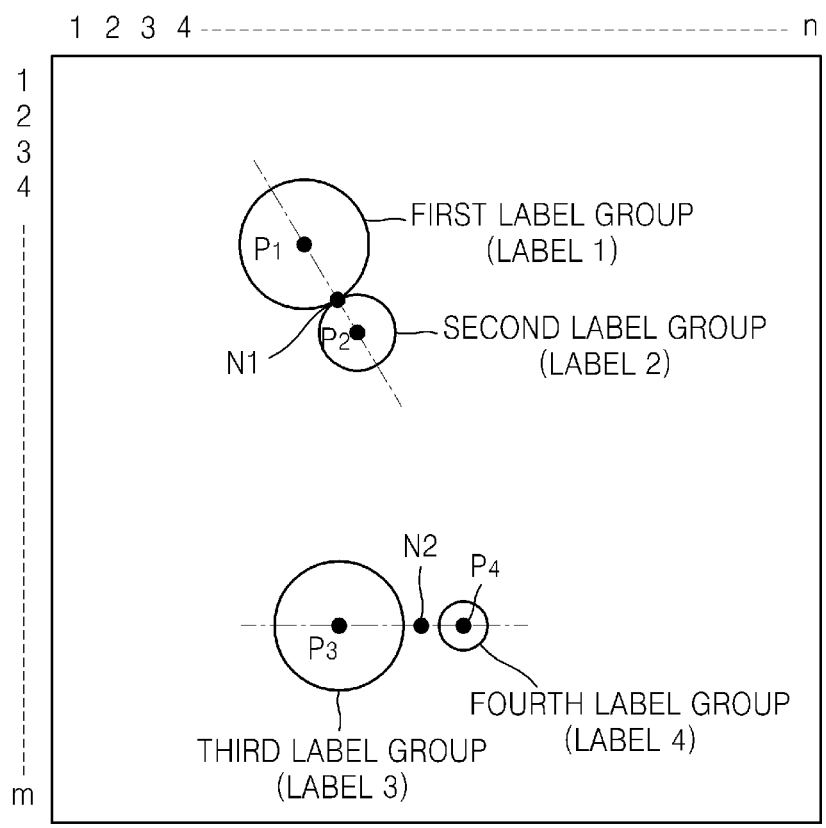
FIG. 10 is a diagram illustrating a method of combining label groups, according to one exemplary embodiment.

Referring to FIG. 10, from among nodes positioned between a peak node P1 of a label group 1 having a label 1 and a peak node P2 of a label group 2 having a label 2, a node N1 having the smallest touch data is compared with touch data of each of the peak node P1 and the peak node P2. The node N1 and the peak node P1 are compared, and the node N1 and the peak node P2 are compared, and as results of the two comparisons, when one of the results of the two comparisons or both results of the two comparisons are equal to or greater than a predetermined value, it may be determined that the label groups 1 and 2 have to be combined. For example, if one or both of the ratio of the touch data of node N1 to the touch data of node P1, and the ratio of the touch data of node N1 to the touch data of node P2 are equal to or greater than a predetermined value, it is determined that the label groups 1 and 2 have to be combined. Similarly, from among nodes positioned between a peak node P3 of a label group 3 and a peak node P4 of a label group 4, a node N2 having the smallest touch data is compared with touch data of each of the peak node P3 and the peak node P4, and it is determined whether or not to combine the label groups 3 and 4.

In another example, if the number of nodes included in each of two label groups positioned within a predetermined range is equal to or less than a predetermined value, or if the number of nodes included in two label groups exceeds a predetermined value when they are summed up, then it is determined that the two label groups are required to be combined.

Figure 11:
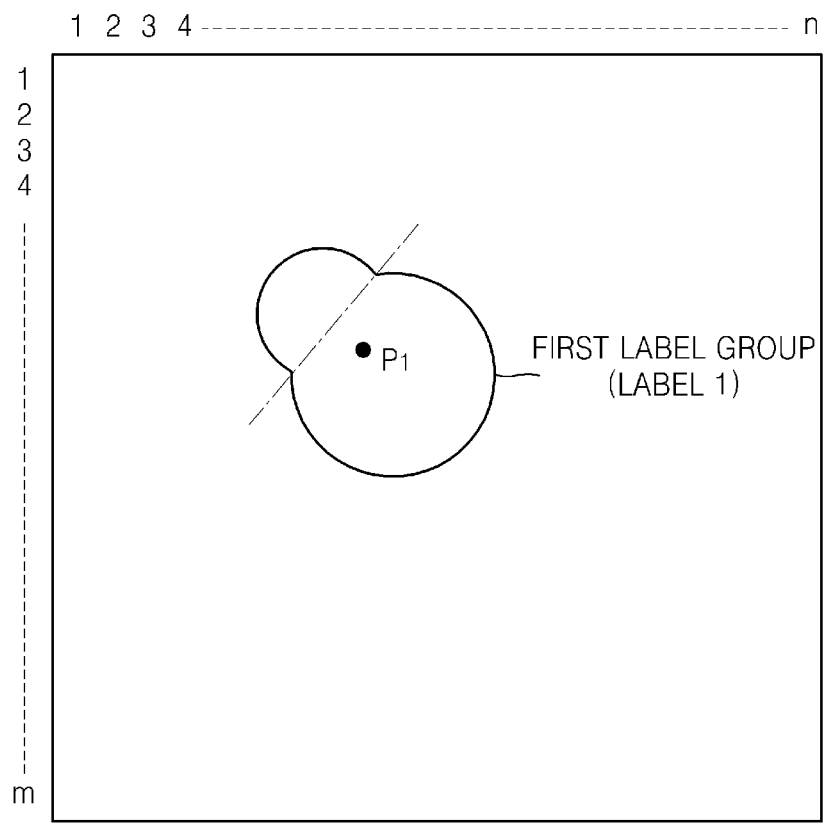
FIG. 11 is a diagram illustrating a method of re-segmenting a label group, according to one exemplary embodiment.

Next, when there are label groups required to be combined, the label groups are combined (operation S930). If there are no label groups required to be combined, it is determined whether to segment the group into two or more label groups (operation S940). The determination with respect to classification may be performed according to various methods. For example, as illustrated in FIG. 11, when an outer line of a touch signal formed along nodes included in a label group includes at least two convex portions, it may be determined that the label group is required to be re-segmented into at least two label groups.

When it is determined that the label group is required to be re-segmented, the label group may be re-segmented into at least two label groups (operation S950). Next, it is determined whether there are other label groups that are not checked with respect to the correction (operation S960), and then the aforementioned label correction operations S910 through S950 are performed on the other label groups.

Figure 12:
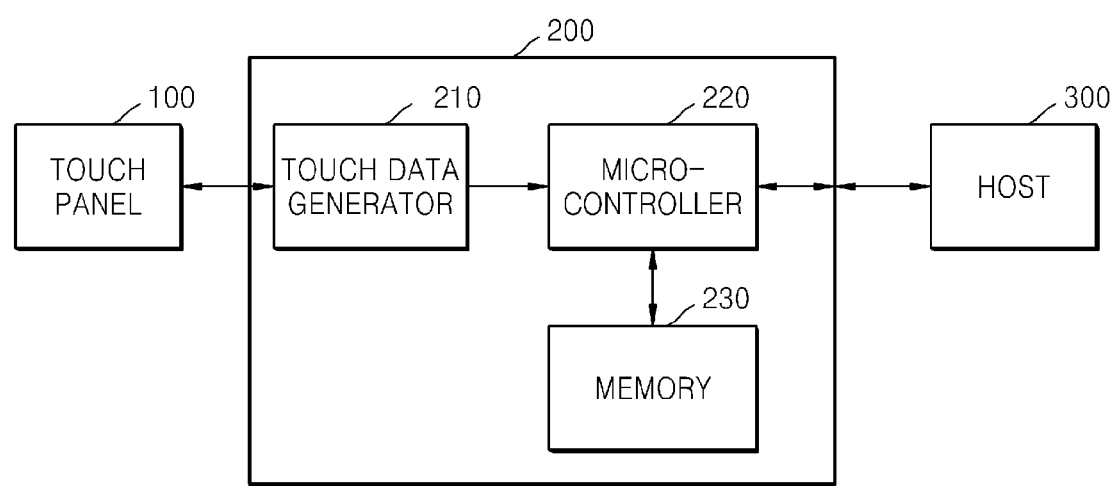
FIG. 12 is a block diagram of a touch sensor system having a multi-touch segmentation function, according to one exemplary embodiment.

FIG. 12 is a block diagram of a touch sensor system having a multi-touch segmentation function, according to one exemplary embodiment.

The touch sensor system includes a touch panel 100 and a touch controller 200, and may comprise an apparatus that is part of a product, such as discussed below.

When a touch occurs, the touch panel 100 transmits a change of a physical characteristic at a point of the touch to the touch controller 200. For example, when the touch panel 100 is an electrostatic capacitive-type touch panel, a touch signal indicating a change of mutual capacitance at the point of the touch may be transmitted to the touch controller 200.

The touch controller 200 recognizes the occurrence of the touch by measuring the touch signal received from the touch panel 100, calculates coordinates of the point of the occurrence of the touch, and provides the coordinates to a host 300. The host 300 may be, for example, an application processor of an electronic device having the touch sensor system mounted therein.

In one embodiment, the touch controller 200 includes a touch data generator 210, a micro-controller 220, and a memory 230.

The touch data generator 210 generates touch data based on the touch signal received from the touch panel 100, and transmits the touch data to the micro-controller 220. The micro-controller 220 determines the occurrence of the touch based on the touch data, and calculates the coordinates of the point of the touch. The memory 230 stores various types of information or algorithms, which are used for operations of the touch controller 200. The touch data generated by the touch data generator 210 or information for calculation of the coordinates of the touch may be stored. The multi-touch segmentation algorithm 710 and the plurality of pieces of performance information 720 may be stored in the memory 230 but are not limited thereto. The multi-touch segmentation algorithm 710 or the plurality of pieces of performance information 720 may be stored in an internal storage region of the micro-controller 220.

When the touch occurs on the touch panel 100, the touch signal is transmitted to the touch controller 200. The touch data generator 210 receives the touch signal and then generates the touch data. In one embodiment, the touch signal transmitted from the touch panel 100 is an analog signal. The touch data generator 210 generates the touch data, which is a digital signal, by amplifying and then converting the touch signal. The micro-controller 220 loads the multi-touch segmentation algorithm 710 from the storage region such as the memory 230 and then executes it. The micro-controller 220 may store the performance information 720 that is generated during execution of the multi-touch segmentation algorithm 710 or may calculate the coordinates of the touch by performing the method of segmenting multiple touches by using the stored performance information 720.

Figure 13:
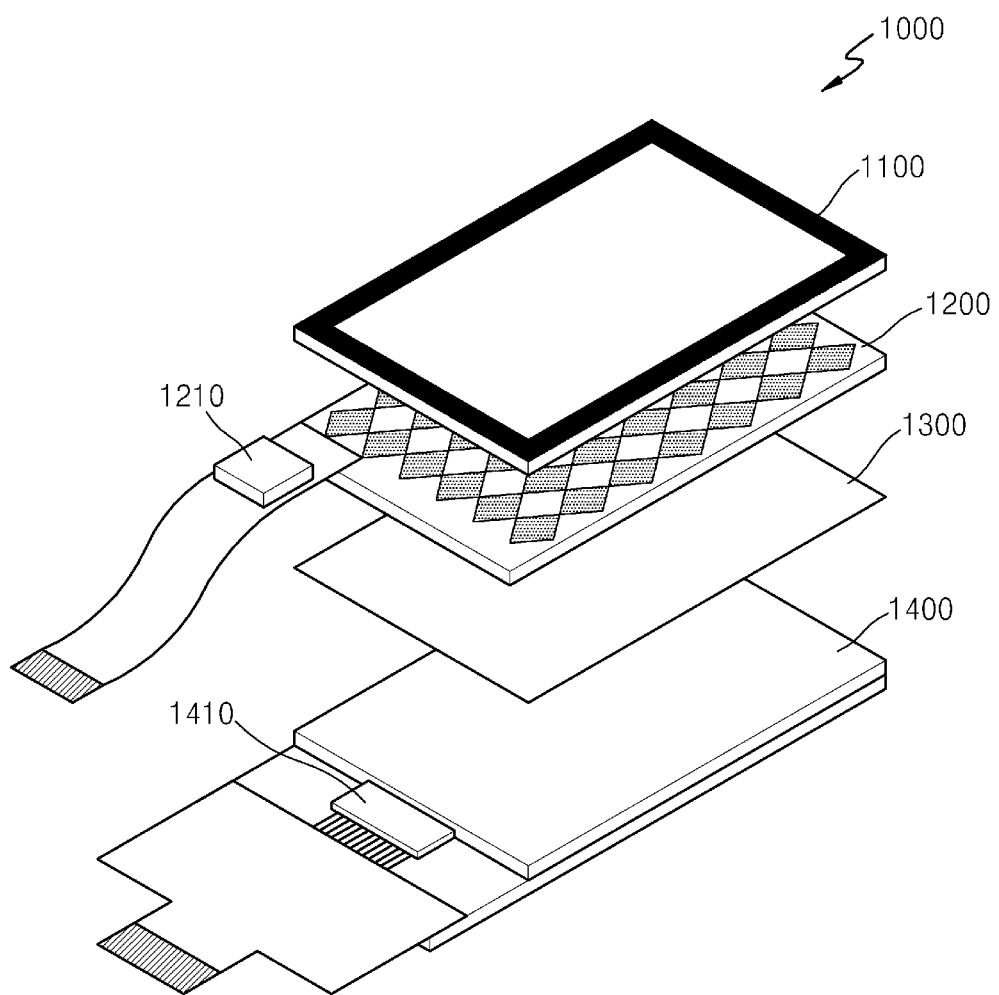
FIG. 13 illustrates a printed circuit board (PCB) structure of a touch display device having a touch sensor system mounted therein, according to certain embodiments.

FIG. 13 illustrates a printed circuit board (PCB) structure of a touch display device 1000 having a touch sensor system mounted therein, according to an exemplary embodiment.

The touch display device 1000 may include a window glass 1100, a touch panel 1200, and a display panel 1400. Also, a polarizing plate 1300 for an optical characteristic may be additionally disposed between the touch panel 1200 and the display panel 1400.

A touch controller 1210 performs the method of segmenting multiple touches according to the one or more embodiments. The touch controller 1210 may be mounted to the flexible PCB, which is connected between the touch panel 1200 and a main-board, in the form of a chip-on-board (COB). However, the touch controller 1210 is not limited thereto and thus may be mounted on a main-board of a graphic system.

In general, the window glass 1100 is manufactured of a material such as acryl or reinforced glass, and protects a module against external shock or a scratch due to repetitive touches. The touch panel 1200 is formed on a glass substrate or a polyethylene terephthalate (PET) film by patterning an electrode by using a transparent electrode such as an indium tin oxide (ITO). The touch controller 1210 detects a capacitance change of each electrode, segments multiple touches, and then extracts touch coordinates. The display panel 1400 is formed by bonding two glasses formed of an upper glass and a lower glass. Also, in general, a display driving circuit 1410 is attached on a display panel for mobile device, in the form of a chip-on-glass (COG). In another example, the touch controller 1210 and the display driving circuit 1410 may be integrated in one semiconductor chip.

Figure 14:
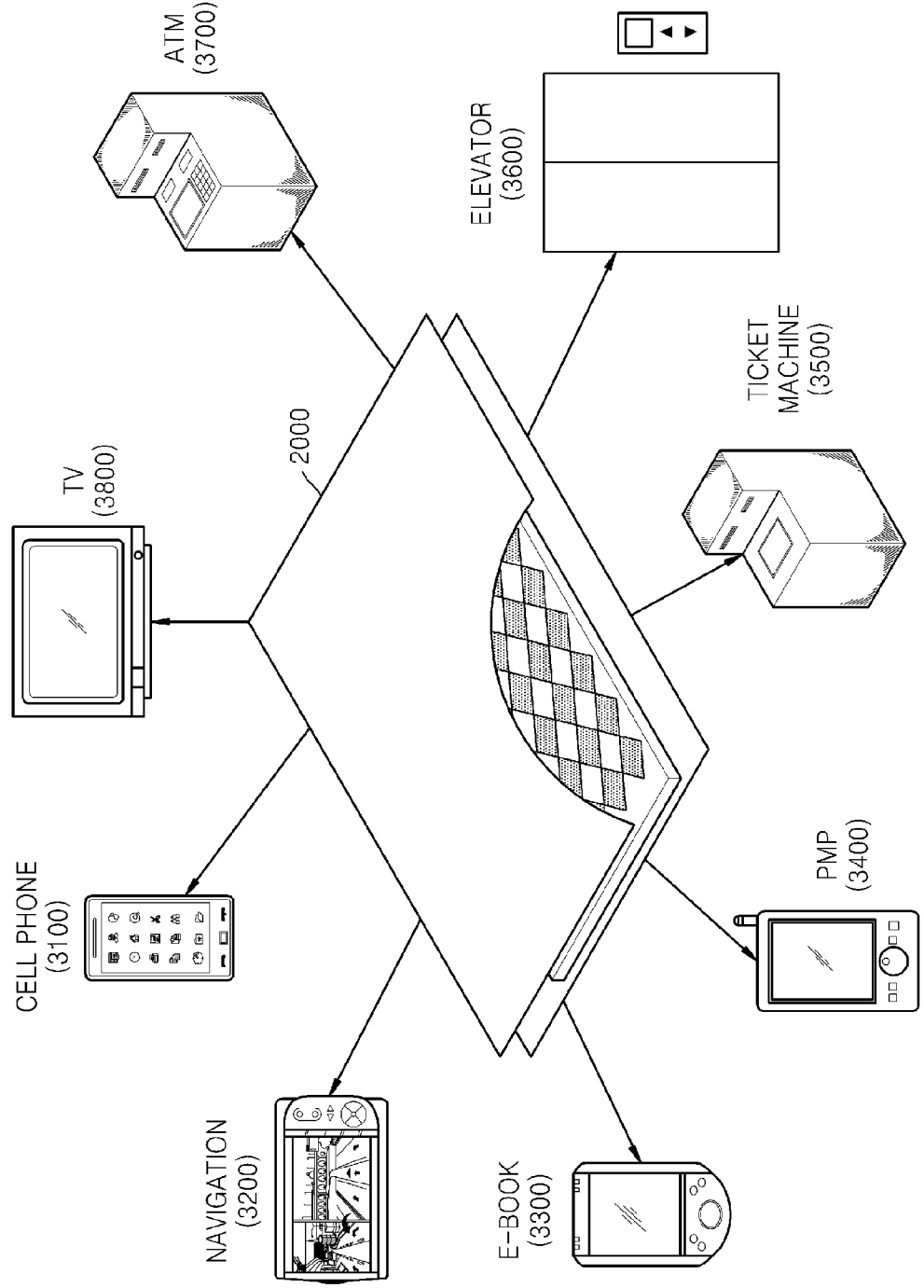
FIG. 14 illustrates various products to which a touch sensor system is mounted, according to certain embodiments.

FIG. 14 illustrates various exemplary products to which a touch sensor system 2000 may be mounted, according to certain embodiments.

Currently, touch screen-type products are used in various fields, and due to their spatial advantages, the touch screen-type products are rapidly replacing button-type devices. The highest demand is appearing in the mobile phone field, which is led by smart phones. In particular, a mobile phone is very sensitive not only to its convenience but also is sensitive to its terminal size. Thus, it is well known that, recently, a touch phone-type mobile phone that does not have separate keys or that has a minimum number of keys is in the limelight. Thus, the touch sensor system 2000 may be applied not only to a cell phone 3100 but also widely applied to a navigation 3200, an electronic book (e-book) 3300, a portable media player (PMP) 3400, a ticket machine 3500 that is used in a subway system or the like, a elevator 3600, an automatic teller machine (ATM) 3700 that automatically performs depositing or withdrawing cash of a bank, a television 3800 employing a touch screen, or the like. In addition, a touch display device is rapidly replacing a conventional button-type interface in all fields requiring a user interface, and in order to allow the aforementioned devices to accurately operate according to a user's touch on the touch display device, the method of segmenting multiple touches, according to the one or more embodiments described herein, may be considerably and usefully applied thereto.

While the present disclosure has been particularly shown and described with reference to exemplary embodiments thereof, it will be understood that various changes in form and details may be made therein without departing from the spirit and scope of the following claims.

What is claimed is:

1. A method of segmenting multiple touches in a touch sensor system, the method comprising:
setting a point node by selecting a valid node of a touch sensor panel from among valid nodes having touch data equal to or greater than a threshold value of a touch sensor panel;

determining one or more candidate labels for the point node by searching for adjacent nodes around the point node; and when there are two or more candidate labels for the point node, labeling the point node by selecting one label from among the two or more candidate labels, the selected label being a label of a label group that has the highest group similarity with the point node and that is from among label groups of the two or more candidate labels, and by assigning the selected label to the point node.

2. The method of claim 1, wherein the determining of the candidate labels includes determining labels of the adjacent nodes having touch data greater than touch data of the point node as the candidate label for the point node.

3. The method of claim 1, wherein, when at least one adjacent node from among the adjacent nodes having touch data greater than touch data of the point node is not labeled, the determining one or more of the candidate labels comprises setting the at least one adjacent node as a new point node, labeling the new point node, and then determining candidate labels for the point node based on the labels of the adjacent nodes having touch data greater than touch data of the new point node.

4. The method of claim 1, wherein, when there is only one candidate label, the labeling the point node comprises assigning the one candidate label to the point node.

5. The method of claim 1, wherein, when there is no candidate label to be assigned to the point node, the labeling of the point node comprises assigning a new label to the point node if at least one adjacent node from among the adjacent nodes is a valid node, and processing the point node as an invalid node if a valid node does not exist in the adjacent nodes.

6. The method of claim 1, wherein, when there are two or more candidate labels, the labeling of the point node comprises setting the point node as a conflict node and storing the conflict node, and then a setting of another point node, a determining of another candidate label, and a labeling the other point node are repeated to label valid nodes except for the conflict node, and after the valid nodes except for the conflict node are labeled, the conflict node is labeled by the selecting a label for the conflict node.

7. The method of claim 1, wherein the group similarity is determined according to a distance between the point node and a peak node from among the valid nodes included in the label group.

8. The method of claim 1, wherein the group similarity is determined according to a distance between the label group and the point node.

9. The method of claim 1, wherein the group similarity is determined according to a difference between touch data of the point node and touch data of a peak node from among the valid nodes included in the label group.

10. The method of claim 1, wherein the group similarity is determined according to a difference between touch data of the point node and touch data of an adjacent node included in the label group.

11. The method of claim 1, wherein searching for adjacent nodes includes searching for nodes next to the point node, wherein no nodes are positioned between the point node and the nodes next to the point node, and wherein the touch data is obtained based on capacitances of each node included in a touch panel.

12. A method of segmenting multiple touches in a touch sensor system, the method comprising:

obtaining touch data of each of a plurality of nodes included in a touch panel;

selecting a node from among nodes having touch data equal to or greater than a threshold value, wherein when two or more labels are assigned among other nodes having touch data greater than touch data of the selected node, which other nodes are adjacent nodes around the selected node, labeling the selected node with a selected label, wherein the selected label is from among the two or more labels and is selected based on the highest group similarity with the selected node; and as a result of all valid nodes of the plurality of nodes being labeled, segmenting the valid nodes into one or more label groups according to assigned labels.

13. The method of claim 12, further comprising performing correction by combining at least two adjacent label groups from among the one or more label groups, or by re-segmenting one label group into at least two label groups.

14. The method of claim 13, wherein the performing of the correction comprises deciding whether to combine the at least two adjacent label groups by comparing touch data of each peak node of the at least two adjacent label groups, and touch data of a node positioned between the peak nodes of the at least two adjacent label groups, or deciding whether to re-segment the one label group into at least two label groups by determining the existence of at least two convex portions in a shape of the one label group.

15. A touch sensor apparatus, comprising:
at least one processor;
executable computer program code;
memory storage; and
a touch panel including a plurality of nodes for sensing touch;
wherein the at least one processor, in conjunction with the executable computer program code and the memory storage, is configured to:
select a valid node of the touch panel;
determine whether all valid neighboring nodes of the selected node are assigned to a first group, and
in response, if all valid neighboring nodes of the selected node are assigned to the first group, assign the selected node to the first group;
determine whether each valid neighboring node of the selected node is assigned to a group, and whether some of the valid neighboring nodes of the selected node are assigned to different groups, and
in response, if each valid neighboring node of the selected node is assigned to a group, and some of the valid neighboring nodes of the selected node are assigned to different groups, select a group from among the different groups, and assign the selected node to the selected group.

16. The touch sensor apparatus of claim 15, wherein:
each valid neighboring node of the selected node is a node next to the selected node without any other nodes therebetween, and is a node having touch data that surpasses a particular threshold value.

17. The touch sensor apparatus of claim 16, wherein the at least one processor, in conjunction with the executable computer program code and the memory storage, is further configured to:
determine whether any valid neighboring nodes of the selected node have a touch strength greater than a touch strength of the selected node and are not assigned to any group, and
in response, if any valid neighboring nodes of the selected node have a touch strength greater than a touch strength of the selected node but are not assigned to any group, assign any remaining unassigned nodes of the neighboring nodes that have a greater touch strength than a touch strength of the selected node to a group, wherein the at least one processor, in conjunction with the executable computer program code and the memory storage, is configured to perform the step of assigning any remaining unassigned nodes to one or more respective groups prior to assigning the selected node to a group.

18. The touch sensor apparatus of claim 16, wherein the at least one processor, in conjunction with the executable computer program code and the memory storage, is further configured to:

determine whether the selected node has valid neighboring nodes, and if so, determine whether any of the valid neighboring nodes have a touch strength greater than or equal to the touch strength of the selected node, and if the selected node has valid neighboring nodes, but none of these neighboring nodes have a touch strength greater than or equal to the touch strength of the selected node, assign a new group to the selected node.

19. The touch sensor apparatus of claim 15, wherein the at least one processor, in conjunction with the executable computer program code and the memory storage, is further configured to:

select the group from among the different groups by comparing a similarity of the selected node to the different groups, and select the group based on the closest similarity.

20. The touch sensor apparatus of claim 18, wherein the at least one processor, in conjunction with the executable computer program code and the memory storage, is further configured to:

determine a similarity of the selected node to the different groups by one or more of:

for each group, comparing a distance between a peak node of the group and the selected node; and for each group, comparing a value of touch data associated with the group to a value of touch data for the selected node.

21. A touch sensor apparatus, comprising:

at least one processor;

executable computer program code;

memory storage; and a touch panel including a plurality of nodes for sensing touch;

wherein the at least one processor, in conjunction with the executable computer program code and the memory storage, is configured to:

determine a candidate label for a point node;

determine the point node of the touch panel to be a conflict node;

store, in the memory storage, a conflict node position of the conflict node; and select the candidate label as the label for the conflict node, based at least on a distance between the conflict node and a peak node.

22. The touch sensor apparatus of claim 21, wherein the at least one processor, in conjunction with the executable computer program code and the memory storage, is configured to:

determine the point node to be the conflict node when two or more candidate labels are determined for the point node.

23. The touch sensor apparatus of claim 21, wherein the at least one processor, in conjunction with the executable computer program code and the memory storage, is configured to:

determine the candidate label for the point node by determining labels of adjacent nodes to the point node.

24. The touch sensor apparatus of claim 21, wherein the adjacent nodes have touch data greater than touch data of the point node.

25. The touch sensor apparatus of claim 21, wherein the at least one processor, in conjunction with the executable computer program code and the memory storage, is configured to:

select the candidate label for the conflict node based at least on a distance between the conflict node and a label group.

* * * * *